June 26, 1945.  J. FIEDLER  2,379,347
CUTTER HEAD
Filed Dec. 10, 1941   2 Sheets-Sheet 1
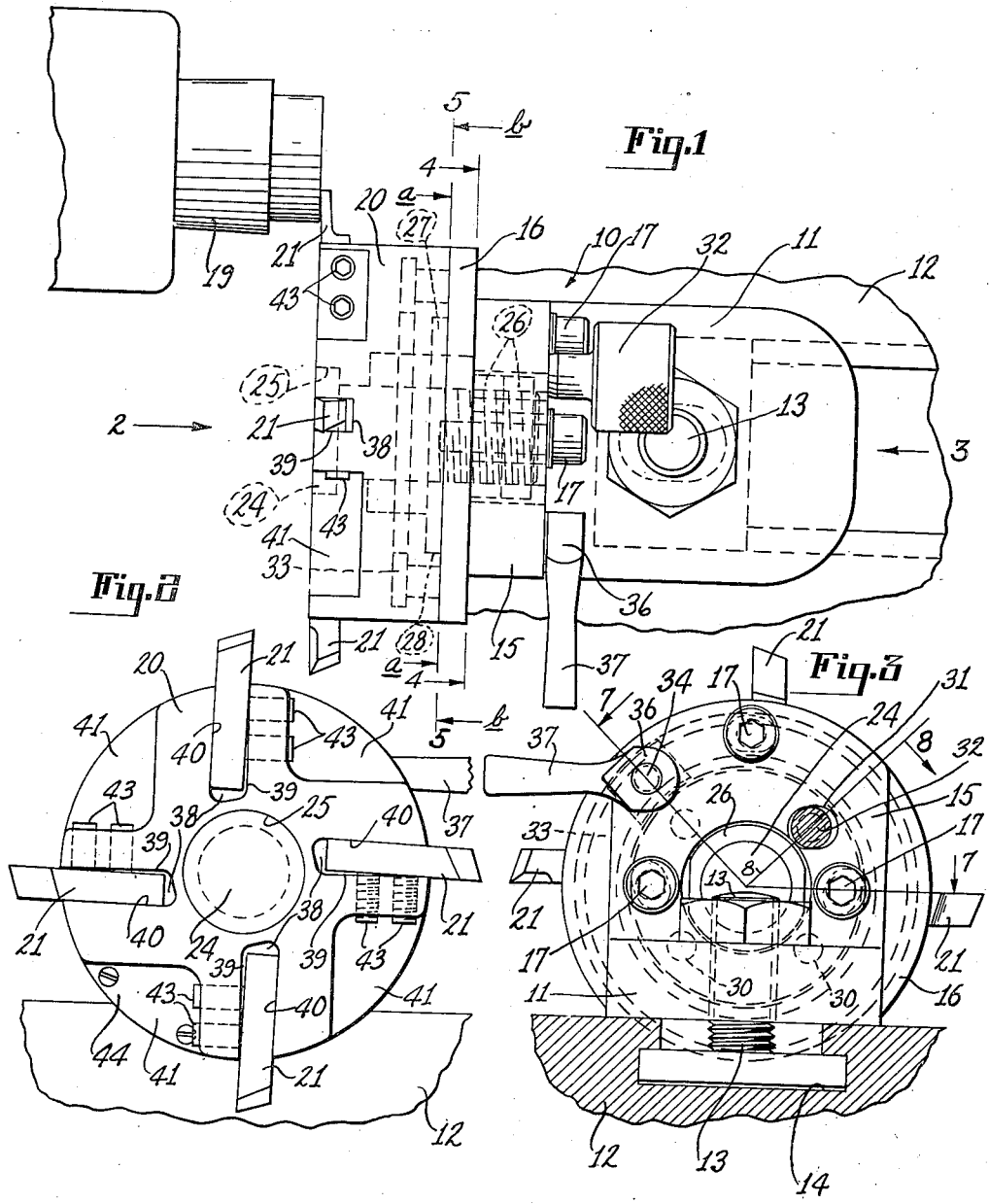
INVENTOR
JOHN FIEDLER
BY
ATTORNEY June 26, 1945.  J. FIEDLER  2,379,347
CUTTER HEAD
Filed Dec. 10, 1941  2 Sheets-Sheet 2
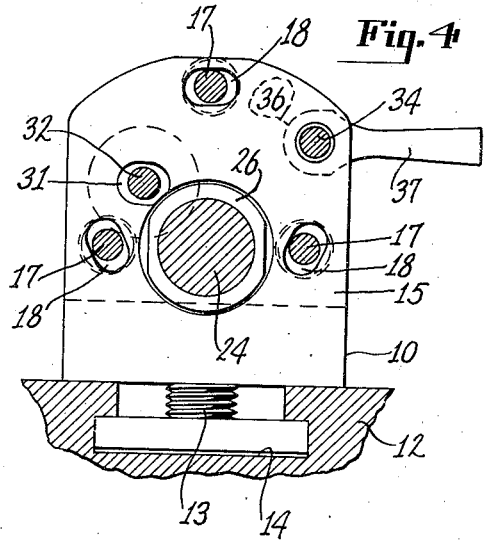
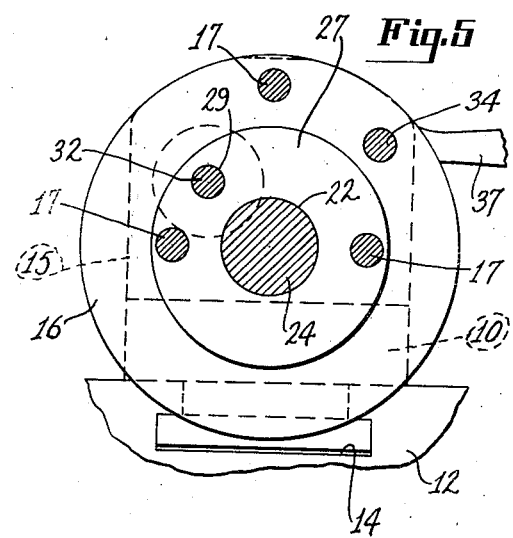
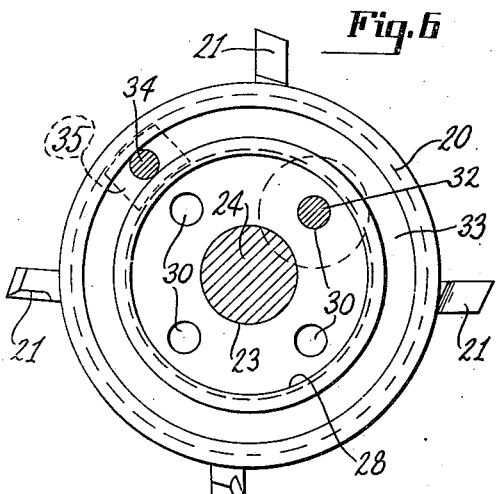
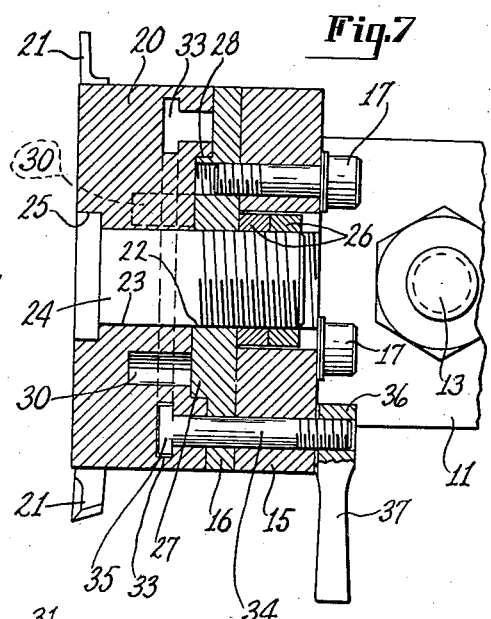
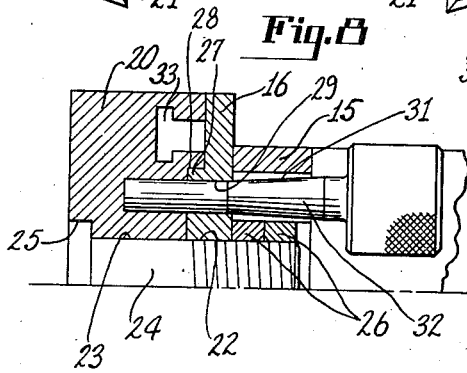
INVENTOR
JOHN FIEDLER
BY
ATTORNEY Patented June 26, 1945

2,379,347

UNITED STATES PATENT OFFICE 2,379,347

CUTTERHEAD

John Fiedler, Dayton, Ohio

Application December 10, 1941, Serial No. 422,372

10 Claims. (Cl. 29—49)

This invention relates to a cutter head for a lathe or similar machine.

One object of the invention is to provide a strong durable cutter head which can be easily actuated to bring a selected cutter into operative position and to secure the same in that position.

A further object of the invention is to provide a cutter head which will rigidly support the selected cutter in its operative position and prevent the vibration or other movement thereof.

A further object of the invention is to provide a cutter head in which the cutter carrying member may be quickly and easily moved to and secured in a selected position.

A further object of the invention is to provide a cutter head of such a character that the work support or chuck may be moved to a position close to the operating plane of the cutter.

A further object of the invention is to provide a cutter head in which the rigid indexing member may be adjusted with relation to its support without affecting its relation to the cutter carrying member.

Other objects of the invention may appear as the device is described in detail.

In the accompanying drawings Fig. 1 is a plan view of a cutter head embodying my invention; Fig. 2 is a front elevation of the same; Fig. 3 is a rear elevation of the cutter head with the locking pin in section; Fig. 4 is a section taken on the line 4—4 of Fig. 1, looking in the direction of the arrows; Fig. 5 is a section taken on the line 5—5 of Fig. 1, looking in the direction of the arrows a; Fig. 6 is a section taken on the line 5—5 of Fig. 1, looking in the direction of the arrows b; Fig. 7 is a staggered section taken on the line 7—7 of Fig. 3; and Fig. 8 is a partial section taken on the line 8—8 of Fig. 3.

In these drawings I have illustrated one embodiment of my invention and have shown the same as designed primarily for use on a lathe but it will be understood that the cutter head, and the various parts thereof, may take various forms and may be used with various machines without departing from the spirit of the invention.

In that embodiment of the invention here illustrated the cutter head as a whole comprises a supporting structure 10 on which the several operating parts are supported and which is itself adjustably supported. In the present instance the supporting structure is in the form of a right angle bracket, the horizontal portion 11 of which is slidably supported on the table 12 of a lathe, or the like, and is rigidly secured in adjusted positions thereon by a bolt 13 the head of which is mounted in a T-shaped slot 14 in the table.

Rigidly mounted on the upright portion 15 of the supporting structure is a member 16 which is preferably in the form of a circular disk and which, among other things, serves to locate the cutter carrying member in selected positions and may therefore be characterized as an indexing member. This member 16 may be secured to the supporting structure in any suitable manner but preferably it is formed separately therefrom and is secured thereto by a plurality of screws 17 which extend through openings 18 in the upright portion of the supporting structure.

Rotatably mounted in front of and close to the member 16 is a cutter carrying member 20 which is circular in form and is provided with means for supporting thereon a plurality of cutters, 21, which are movable successively into operative relation to the work 19 by the rotation of the member 20. Each cutter is different from the others and adapted to perform a different kind of work. This cutter carrying member may be rotatably supported on the supporting structure 10 in any suitable manner and, in the present instance, it is directly mounted on the indexing member 16, which as has been explained, is rigidly secured to the supporting structure. In the form shown the members 16 and 20 are provided with axially alined openings, 22 and 23 respectively, adapted to receive a bolt 24 which extends through both members and forms a pivot pin for the cutter carrying member. The outer end of the opening 23 is countersunk, as shown at 25, to receive the head of the bolt, and that portion of the bolt which extends beyond the fixed member 16 is screw threaded to receive nuts 26. The adjacent faces of the members 16 and 20 are provided with bearing surfaces which are normally in contact one with the other, the frictional contact between these members being regulated by the nuts 26 on the pivot pin. The contact between these two bearing surfaces should be such as to permit the rotation of the cutter carrying member with relation to the fixed member 16 without permitting any axial or vibratory movement of the cutter carrying member. The cutter carrying member 20 is positively centered with relation to and supported on the fixed member 16 by providing the fixed member with an annular projection 27 arranged about the opening 22 therein and extending outwardly from the fixed member into an annular recess 28 arranged about the opening 23 in the cutter carrying member, and fitting snugly therein so that the peripheral surfaces of the projection and recess will have bearing contact one with the other.

Means are provided for locking the cutter carrying member 20 against rotation with relation to the fixed member 16, this means being of such a character that the cutter carrying member can be quickly and easily released to permit it to be rotated to bring a selected cutter into operative position and then quickly secured against further rotation. In the arrangement here illustrated the fixed member 16 is provided with an opening 29 and the cutter carrying member has in its inner face a series of locking recesses 30 so arranged that they may be brought successively into line with the opening 29 by the rotation of the cutter carrying member. The supporting structure is also provided with an opening 31 in line with the opening 29 and a locking pin 32 extends through the openings 31 and 29 and into the locking recess 30 which is in line with those openings. Means are also provided for clamping the cutter carrying member firmly against the fixed member 16 so as to relieve the locking pin 32 of much of the strain to which it would otherwise be subjected during the cutting operation and to firmly hold the cutter carrying member against all movement or vibration. For this purpose an annular groove 33, T-shaped in cross section, is formed in the inner face of the cutter carrying member and a bolt 34 has its head 35 slidably mounted in that groove and extends through alined openings in the fixed member 16 and the upright part 15 of the supporting structure. A nut 36 is mounted on the outer end of the bolt and when tightened down against the supporting structure clamps the cutter carrying member tightly against the fixed member 16. Preferably the nut is provided with a handle 37 to enable it to be quickly and easily operated. This nut is arranged between the heads of two of the screws 17 but there is room for sufficient movement of the handle 37 to tighten or loosen the bolt.

The cutters 21 may be mounted on the cutter carrying member in any suitable manner but preferably the outer face of this cutter carrying member is substantially flat and the cutters are set into the cutter carrying member close to the forward surface thereof but do not project beyond that surface. Consequently the work support or chuck can be moved close to the operating plane of the cutters so that the cutter which is in operative position can engage the work close to the end of the chuck. In the present construction the outer face of the cutter supporting member 20 has formed therein a plurality, in the present instance four, substantially radial grooves 38 adapted to receive the shank portions of the cutters 21 and of a depth at least equal to the thickness of those shank portions. It is desirable that the point of the cutter should be slightly elevated with relation to the shank portion and, as here shown, one wall 39 of each groove, which is the top wall when the corresponding cutter is in operative position, is approximately radial and the other or lower wall 40 diverges inwardly from the wall 39, thus providing an inclined support for the cutter. The cutters may be secured in their respective grooves in any suitable manner and I prefer to provide the face of the cutter with recesses 41 arranged between adjacent grooves 38 and arranged to determine the thickness of the walls 39 and 40, and this permits of the insertion of screws 43 through the wall 39 of each groove to firmly clamp the cutter against the opposed wall 40. An opening, not shown, extends from one of the recesses 41 through the member 20 to the T-shaped groove, to permit the bolt 34 to be inserted in that groove, and this opening is closed by a plate 44, as shown in Fig. 2.

The cutter head is adapted to be mounted on lathes or other machines of different kinds and in which there may be some slight difference in the positions of the work supports or chucks which makes it desirable to slightly alter the working position of the cutters. To enable this to be done without affecting the relation of the fixed or indexing member 16 to the cutter carrying member I have made the openings 18 in the supporting structure slightly larger than the attaching screws 17 which extend through the same into the fixed member 16. Thus by loosening those screws the fixed member may be so rotated as to locate the cutter in the desired operative position and secured in that position by again tightening down the screws. The opening 31 in the supporting structure, for the locking pin 32, is also slightly larger than the adjacent diameter of the locking pin so that the locking pin may be inserted through the same after the fixed member 16 has been adjusted as above stated.

While I have shown and described one embodiment of my invention I wish it to be understood that I do not desire to be limited to the details thereof as various modification may occur to a person skilled in the art.

Having now fully described my invention, what I claim as new and desire to secure by Letters Patent, is:

1. In a cutter head, an upright member having means whereby it may be mounted on a horizontal support for adjustment lengthwise thereof and having an upright face transverse to the line of said adjustment, a cutter carrying member having means for supporting a plurality of cutters and having a face opposed to said face of said upright member, a device for rotatably supporting said cutter carrying member and including means for moving the same into face to face engagement with said upright member and for regulating the frictional contact between said faces, and means operable independently of said supporting and adjusting device for locking said cutter carrying member in selected rotatively adjusted positions.

2. In a cutter head, an upright member having means whereby it may be mounted on a horizontal support for adjustment lengthwise thereof and having an upright face transverse to the line of said adjustment, a cutter carrying member having means for supporting a plurality of cutters and having a face opposed to said face of said upright member means including a pivot pin for supporting said cutter carrying member for rotation with relation to said upright member, a nut threaded on said pivot pin to move said cutter carrying member into face to face engagement with said upright member, and a locking device operable independently of said nut to secure said cutter carrying member in selected positions about the axis of said pivot pin.

3. In a cutter head, an upright supporting member having means whereby it may be mounted for adjustment lengthwise of the axis of rotation of a rotatable work support, an indexing member mounted on said supporting member, held normally against movement with relation thereto and having one face thereof substantially in a plane intersecting the axis of said rotatable work support, a cutter carrying member arranged face to face with said indexing member and having means for supporting a plurality of cutters, said cutter carrying member and said indexing member having alined openings, a pivot pin extending through said openings to support said cutter carrying member for rotation with relation to said indexing member to move a selected cutter to operating position, and means whereby said indexing member may be adjusted about the axis of said pivot pin to modify the operating position of said selected cutter.

4. In a cutter head, a supporting member having means for mounting the same in an upright position and having an opening therethrough, an upright member rigidly secured to said supporting member and having an opening in line with and of less diameter than the opening in said supporting member, a cutter carrying member arranged face to face with said upright member and having an axial opening in line with the opening in said upright member, a pivot pin extending through said openings in said cutter carrying member and said upright member and having a threaded portion extending into the opening in said supporting member, said pivot pin also having a head engaging said cutter carrying member adjacent the outer end of the opening in the latter, a nut on the threaded portion of said pivot pin in said opening in said supporting member to secure said cutter carrying member in firm rotatable contact with said upright member, and means independent of said pivot pin for locking said cutter carrying member in selected positions with relation to said upright member.

5. In a cutter head, a supporting member having means for mounting the same on a horizontal support for adjustment lengthwise thereof and including an upright part rigid therewith, said upright part having an opening therethrough and having one face thereof substantially in a plane transverse to the line of said adjustment and provided with a shoulder concentric with said opening, a disk-like cutter carrying member arranged face to face with said upright part, having an opening in line with the opening in said upright part and having an annular shoulder concentric with said opening and arranged about and in bearing contact with the shoulder on said upright part, a pivot pin extending through said openings to rotatably support said cutter carrying member and having means to limit the axial movement thereof with relation to said upright part, and axially movable means separate from said pivot pin and operable from the outer side of said upright part for clamping said cutter carrying member against said face of said upright part to lock the same in rotatively selected positions with relation to said upright part.

6. In a cutter head, a supporting structure having means whereby it may be mounted on a fixed support for adjustment lengthwise thereof, an upright indexing member rigid with the supporting structure and having a bearing surface substantially in a plane transverse to the line of said adjustment, a cutter carrying member having a bearing surface cooperating with the bearing surface of said indexing member, means for supporting said cutter carrying member on said supporting structure for rotation with relation to said indexing member upon an axis intersecting said bearing surfaces and for maintaining said surfaces in face to face contact one with the other during said rotation of said cutter carrying member, and other means for rigidly connecting said members to clamp said cutter carrying member to said indexing member in a selected position with relation to said indexing member and for releasing the same for rotation about said axis while said bearing surfaces are maintained in said frictional contact.

7. In a cutter head, a supporting structure having means whereby it may be mounted on a fixed support, an indexing member rigid with said supporting structure and having a bearing surface, a cutter carrying member having means for supporting a plurality of cutters thereon and having a bearing surface in contact with the bearing surface of said indexing member, means for supporting said cutter carrying member for rotation with relation to said indexing member about an axis intersecting said bearing surfaces and for maintaining said bearing surfaces in firm frictional contact one with the other, other means for locking said cutter carrying member against rotation and for releasing the same for rotation with relation to said indexing member to move a selected cutter to operating position while said bearing surfaces are maintained in said firm frictional contact, and means for adjusting said indexing member with relation to said supporting structure to vary the operating position of the selected cutter.

8. In a cutter head, a supporting structure having means whereby it may be mounted on a horizontal support for adjustment lengthwise thereof and having rigid therewith a part having an upright face transverse to the line of said adjustment, a disk-like cutter carrying member arranged face to face with said part, said part and said member having alined openings, a pivot pin extending through said openings to rotatably support said cutter carrying member and having means to maintain the adjacent faces of said member and said part in firm rotatable contact one with the other, said cutter carrying member having in that face thereof adjacent said upright part an annular undercut groove, a pin extending through said upright part and having a head mounted in said groove, and means for imparting longitudinal movement to said pin to clamp said cutter carrying member to said upright part.

9. In a cutter head, a supporting structure having means whereby it may be mounted on a horizontal support for adjustment lengthwise thereof and having rigid therewith a part having an upright face transverse to the line of said adjustment, a disk-like cutter carrying member arranged face to face with said part, said part and said member having alined openings, a pivot pin extending through said openings to rotatably support said member and having means to maintain the adjacent faces of said member and said part in firm rotatable contact one with the other, said cutter carrying member having in that face thereof adjacent said upright part a plurality of recesses and an undercut groove concentric with said pin, a clamping pin extending through said upright part and having a head mounted in said groove, means for imparting longitudinal movement to said pin to clamp said cutter carrying member to said upright part, and a locking pin extending through said upright part and adapted to enter any one of the recesses in said cutter carrying member to accurately position said cutter carrying member prior to the clamping operation.

10. In a cutter head, an upright supporting member, an indexing member carried by said supporting member and having an opening therethrough, a cutter carrying member having means for supporting a plurality of cutters and having a central opening therethrough, a pivot pin extending through said openings to rotatably support said cutter carrying member on said indexing member and having means to maintain said cutter carrying member in face to face contact with said indexing member during its rotation with relation thereto, means for locking said cutter carrying member against rotation to support a selected cutter in a predetermined position, said indexing member having a plurality of openings spaced from the first mentioned opening therein, said supporting member having a plurality of elongate openings registering with the respective openings in said indexing member, and attaching devices extending through the openings in said supporting member into the openings in said indexing member to rigidly connect said members one with the other, said attaching devices being of a diameter less than the length of said elongate openings to permit said indexing member to be adjusted with relation to said supporting member to alter the predetermined position of said selected cutter.

JOHN FIEDLER.